United States Patent
Kossi et al.

(10) Patent No.: US 6,912,204 B2
(45) Date of Patent: Jun. 28, 2005

(54) APPARATUS AND ASSOCIATED METHOD, FOR DYNAMICALLY SELECTING FREQUENCY LEVELS UPON WHICH TO DEFINE COMMUNICATION CHANNELS

(75) Inventors: Jouni Kossi, Espoo (FI); Mika Kasslin, Espoo (FI)

(73) Assignee: Nokia Networks Oy, Espo (FI)

( * ) Notice: Subject to any disclaimer, the term of this patent is extended or adjusted under 35 U.S.C. 154(b) by 867 days.

(21) Appl. No.: 09/766,139

(22) Filed: Jan. 19, 2001

(65) Prior Publication Data

US 2002/0097696 A1 Jul. 25, 2002

(51) Int. Cl.[7] .............................................. G01R 31/08
(52) U.S. Cl. .......................... 370/252; 370/329; 455/62
(58) Field of Search .............................. 370/252, 319, 370/340, 341, 329, 344, 330; 455/62, 452.1, 452.2, 509, 513, 437, 423

(56) References Cited

U.S. PATENT DOCUMENTS 5,594,949 A * 1/1997 Andersson et al. ......... 455/437
6,016,313 A 1/2000 Baugh et al. ............... 370/330
6,675,012 B2 * 1/2004 Gray ........................... 455/423

FOREIGN PATENT DOCUMENTS

| EP | 0817521 | 1/1998 | ............ H04Q/7/38 |
| EP | 1009182 | 6/2000 | ............ H04Q/7/36 |

OTHER PUBLICATIONS

International Search Report PC/IB02/00028, dated Apr. 2, 2003.

* cited by examiner

Primary Examiner—Chau Nguyen
Assistant Examiner—Robert W. Wilson
(74) Attorney, Agent, or Firm—Robert M. Bauer (57) ABSTRACT

Apparatus, and associated method, for dynamically selecting frequencies upon which to define communication channels in a communication system, such as a wireless mesh network. Frequency levels are selected for global use throughout the entire mesh network. And, frequency levels upon which to define local communication channels for individual nodes of the mesh network are also selectable.

22 Claims, 9 Drawing Sheets

| NAME | LENGTH | PURPOSE |
|---|---|---|
| TYPE | 3 BIT | DFS PACKET TYPE |
| SPARE | 5 BIT | FOR THE FUTURE USE |
| FREQUENCY | 4 BIT | FREQUENCY TO BE USED IN THE CONTROL CHANNEL |
| START FRAME | 8 BIT | IDENTIFIES THE MAC FRAME |

| SIGNAL LEVEL NUMBER (SLN0) | RSSO [dBm] | TOLERANCE [dB] |
|---|---|---|
| 0 | SPARE | |
| 1 | SPARE | |
| 2 | -93 | +/-6 |
| 3 | -91 | +/-4 |
| 4 | -90 | +/-4 |
| 5 | -89 | +/-4 |
| 6 THROUGH 53 | SLNO-94 | +/-4 |
| 54 | -40 | +/-3 |
| 55 | -38 | +/-3 |
| 56 | -36 | +/-3 |
| 57 | -34 | +/-3 |
| 58 | -32 | +/-3 |
| 59 | -30 | +/-3 |
| 60 | -28 | +/-3 |
| 61 | > -26 | +/-3 |
| 62 | SPARE | |
| 63 | SPARE | |

| | $f_1$ | $f_2$ | ... | $f_n$ |
|---|---|---|---|---|
| MESH[1] (00/01/10) | 00 | 10 | ... | 01 |
| OFFSET[2], IF MESH ≠ 00 (MS) | - | 5.3 | ... | 2.1 |
| RSSI[3] (CONTROL CHANNEL) | -76 | -72 | ... | -50 |
| MAX RSSI (CONTROL CHANNEL) | -70 | -69 | ... | -43 |
| RSSI (DATA CHANNEL) | -72 | -70 | ... | -45 |
| MAX RSSI (DATA CHANNEL) | -71 | -54 | ... | -41 |

| | $f_1$ | $f_2$ | ... | $f_n$ |
|---|---|---|---|---|
| NEIGHBOR 1 | 1011000 | 01110010 | ... | 11100101 |
| NEIGHBOR 2 | 10010101 | 01110010 | ... | 11100101 |
| NEIGHBOR 3 | 10110010 | 00110010 | ... | 11100101 |
| NEIGHBOR 4 | 11110010 | 00110010 | ... | 11100101 |
| NEIGHBOR 5 | 11110010 | 01110010 | ... | 11100101 |
| NEIGHBOR 6 | 11110010 | 00110010 | ... | 01100101 |
| NEIGHBOR 7 | 10110010 | 01110010 | ... | 01100101 |

| NAME | LENGTH | PURPOSE |
|---|---|---|
| DFS_FREQUENCY | 4 BIT | MEASURED FREQUENCY |
| DFS_RSSI_AVE | 8 BIT | AVERAGE RSSI VALUE |
| DFS_RSSI_MAX | 8 BIT | MAX RSSI VALUE |
| DFS_MESH | 2 BIT | MESH ? |
| DFS_MESH_OFFSET | 12 BIT | TIME OFFSET |

| NAME | LENGTH | PURPOSE |
|---|---|---|
| TYPE | 3 BIT | DFS PACKET TYPE |
| SPARE | 5 BIT | FOR THE FUTURE USE |
| RSSI | 34*N BIT | RSSI MEASUREMENTS, ONE RSSI MEASUREMENT ENTRY IS DESCRIBED IN TABLE 9. N IS NUMBER OF MEASURED FREQUENCIES |

| NAME | LENGTH | PURPOSE |
|---|---|---|
| DFS_FREQUENCY | 4 BIT | MEASURED FREQUENCY |
| DFS_RSSI_AVE | 8 BIT | AVERAGE RSSI VALUE |
| DFS_RSSI_MAX | 8 BIT | MAX RSSI VALUE |
| DFS_MESH | 2 BIT | MESH ? |
| DFS_MESH_OFFSET | 12 BIT | TIME OFFSET |

APPARATUS AND ASSOCIATED METHOD, FOR DYNAMICALLY SELECTING FREQUENCY LEVELS UPON WHICH TO DEFINE COMMUNICATION CHANNELS

The present invention relates generally to a manner by which to select frequencies upon which to define communication channels in a communication system, such as a wireless mesh network operable generally pursuant to the IEEE 802.16 standard. More particularly, the present invention relates to apparatus, and an associated method, by which dynamically to select frequency levels upon which to define communication channels in a wireless mesh network, or other radio communication system. Dynamic frequency selection of frequency levels upon which to define global channels, such as control channels to be used throughout the entire wireless mesh network, is provided. And, dynamic frequency selection of frequency levels upon which to define local channels, such as data channels to be used locally at a single node of the wireless mesh network is also provided.

BACKGROUND OF THE INVENTION

A communication system is formed, at a minimum, of a sending station and a receiving station between which information is communicated. A communication channel is formed between the sending station and the receiving station. The information to be communicated by the sending station to the receiving station is communicated thereon. A wide variety of different types of communication systems have been developed and are regularly utilized to effectuate communication of information between the sending and receiving stations.

New types of communication systems have been developed and implemented as a result of advancements in communication technologies. Radio communication systems are exemplary of communication systems which have benefited from the advancements in communication technologies. Improvements to existing types of radio communication systems, and new types of radio communication systems, have been made possible as a result of the advancements in communication technologies.

In a radio communication system, communication channels are defined upon radio links formed between the sending and receiving station operable therein. The radio link upon which the communication channels are formed is defined, at least in part by frequencies of the electromagnetic spectrum. A radio communication system inherently permits greater communication mobility through the use of radio links, rather than conventional wireline connections.

Digital communication techniques, for instance, are amongst the advancements in communication technologies which have permitted the development and implementation of new types of communication systems. The use of digital communication techniques permits the communication capacity of a communication system to be increased as well as also to improve the quality levels of communications effectuated in the communication system.

When digital communication techniques are used, information which is to be communicated is digitized. In one technique, the digitized information is formatted into packets, and the packets are communicated to effectuate the communication. Individual ones, or groups, of the packets of data can be communicated at discreet intervals, and, once communicated, the packets of data can be concatenated together to recreate the informational content of the transmitted information.

A communication channel which packet data is communicated need not be dedicated solely for the communication of data by one sending station to one receiving station, as conventionally required in circuit-switched communications. Instead, a single channel can be shared amongst a plurality of different sending and receiving station pairs. Because a single channel can be utilized to effectuate communications by the plurality of pairs of communication stations, improved communication capacity is possible.

A wireless mesh network is a radio communication system which can be constructed to provide for the communication of packet data. A wireless mesh network typically includes a plurality of nodes, each node capable of communicating with at least one other node. A wireless mesh network is implemented, for instance, as a fixed wireless access (fwa) system capable of communicating broadband data between fixed-site communication stations which form the nodes. Proposals have been set forth to standardized certain operations of certain wireless mesh networks. One proposed standard, and IEEE802.16 standard pertains to wireless mesh networks.

Implementation of a wireless mesh network is possible in an unlicensed frequency band such as the frequency band located at 5 GHz. More than one wireless mesh network might be installed over a common geographical area due to the unlicensed nature of the 5 GHz band. Also, other types of radio communication systems might also be installed at the same geographical area to be operable, or to have frequency harmonics which have significant components, at the 5 GHz band.

The unstructured nature of an unlicensed band, such as the 5 GHz band, provides significant design freedom in the design of a communication system to be operable within the frequency band. However, the unlicensed nature of the band also increases the possibility that signals generated during operation of one communication system within the frequency band might generate signals which interfere with operation of another communication system operable at the same frequency band.

Use of frequency levels within the allocated band which exhibit lowest amounts of interference would best ensure that communication qualities would not be degraded. Appropriate selection of the frequency levels would be required. And, reselection of the frequency levels would also be required if the frequencies of the interference changes over time.

A manner by which dynamically to select frequencies upon which to define channels in a wireless mesh network operable in an unlicensed frequency band, or elsewhere, would be advantageous. Existing proposals related to standardization of wireless mesh networks, however, do not generally provide for dynamic frequency selection.

If a manner could be provided by which better to dynamically select frequency levels upon which to define radio channels, improved communications would be possible.

It is in light of this background information related to communications in a radio communication system, such as a wireless mesh network, that the significant improvements of the present invention have evolved.

SUMMARY OF THE INVENTION

The present invention, accordingly, advantageously provides apparatus, and an associated method, by which to select frequencies upon which to define communication channels in a radio communication system, such as a wireless mesh network operable generally pursuant to the IEEE 802.16 standard.

Operation of an embodiment of the present invention provides a manner by which dynamically to select frequency levels upon which to define communication channels in a wireless mesh network, or another radio communication system.

In one aspect of the present invention, dynamic frequency selection of frequency levels upon which to define global channels, such as the control channels to be used throughout an entire wireless mesh network, is provided.

In another aspect of the present invention, dynamic frequency selection of frequency levels upon which to define local channels, such as data channels to be used locally by a single node of a wireless mesh network in communications with another node, is also provided.

The frequency levels upon which to define global, and also local, channels are selected responsive to measurement of communication quality indicia, such as measured noise levels or packet error rates at a plurality of different frequency levels. Remeasurements of the communication quality indicia at the different frequency levels is made a selected intervals. Thereby, as communication conditions change, reselection of frequency levels upon which to define the communication channels is made. Dynamic frequency selection is thereby effectuated.

Measurements of communication indicia responsive to which a frequency level is selected upon which to define a global control channel is made at each node at the wireless mesh network. In one implementation, the measurements are made during time periods corresponding to control slots defined during the timing protocol set forth for control channel operation in a wireless mesh network, generally operable pursuant to the IEEE802.16 standard. During the time periods corresponding to the control slots, data communications are not effectuated in any of the nodes of the wireless mesh network. Thereby, measurements of the communication indicia at the different frequency levels are unaffected by communications by any of the nodes of the wireless mesh network.

Measurements are made at each of the nodes, and measurement reports are made at the nodes for transmission to a network management station. Initiation of effectuation of the measurements and generation of the reports occurs either automatically or responsive to a specific network management station. Selection of a frequency level upon which to define global channels, such as global control channels, is made responsive to evaluation of the reports returned thereto by each of the different nodes of the wireless mesh network.

Local channels, such as local data channels, local to individual ones of the nodes of the wireless mesh network are defined upon frequency levels selected locally at individual ones of the nodes. Measurements and analyses at individual ones of the nodes are made at least during selected intervals to determine the status of radio links to be used locally, e.g., between two adjacent nodes. Frequency level selections are made responsive thereto. Link quality is measured, for instance, in terms of measurements of packet error rates (per). Noise levels, alternately or in conjunction with, packet error rates, can instead, or also, be measured. Noise measurements are made during time periods in which the frequency is not otherwise utilized. Responsive to the measurements, selection is made of frequency levels upon which to define communication channels.

Thereby, through operation of various embodiments of the present invention, optimal use of a common control channel frequency to be used globally in a mesh network is enabled. Additionally, operating frequency levels upon which to define data channels to be used by individual ones of the nodes is also enabled. Improved reliability and efficiency of use of routed wireless mesh networks in unlicensed, or otherwise unregulated, frequency bands, is permitted.

In one implementation, a manner is provided by which to dynamically select frequencies at which to define both global and local communication channels in a wireless mesh network. Communication indicia measurements are made at each of the nodes and reported to a network management station, thereby to provide information to the network management station by which to select, at the network management station, the frequency level to be used globally and upon which to define global communication channels. Local measurements are also made of communication indicia associated with frequency levels upon which local communication channels are selectable. Selection of the frequency levels to be used locally and upon which to define local communication channels is made locally at individual ones of the nodes.

In these and other aspects, therefore, apparatus, and an associated method, is provided for a wireless mesh network having a first node, at least a second node, and a network management station. The first and at least second nodes and the network management station are intercoupled thereto­gether to permit communications therebetween. Frequency levels at which to define communication channels upon which to effectuate communications during operation of the wireless mesh network are defined. A frequency level quality indicia measurer is positioned at each of the first and at least second nodes. The frequency level quality indicia measurer measures communication quality indicia at a selected plurality of different global frequency levels at the node at which each of the frequency level quality indicia measurers is positioned and also for generating a report representative of values of the communication quality indicia measured thereat. A global channel selector is positioned at the network management station and is coupled to receive reports generated by each of the frequency level quality indicia measurers. The global channel selector selects a first global frequency level at which to define a first global communication channel upon which to communicate first global communication signals with, and between, all of the first and at least second nodes.

A more complete appreciation of the present invention and the scope thereof can be obtained from the accompanying drawings which are briefly summarized below, the following detailed description of the presently-preferred embodiments of the invention, and to the appended claims.

DETAILED DESCRIPTION OF THE INVENTION

Figure 1:
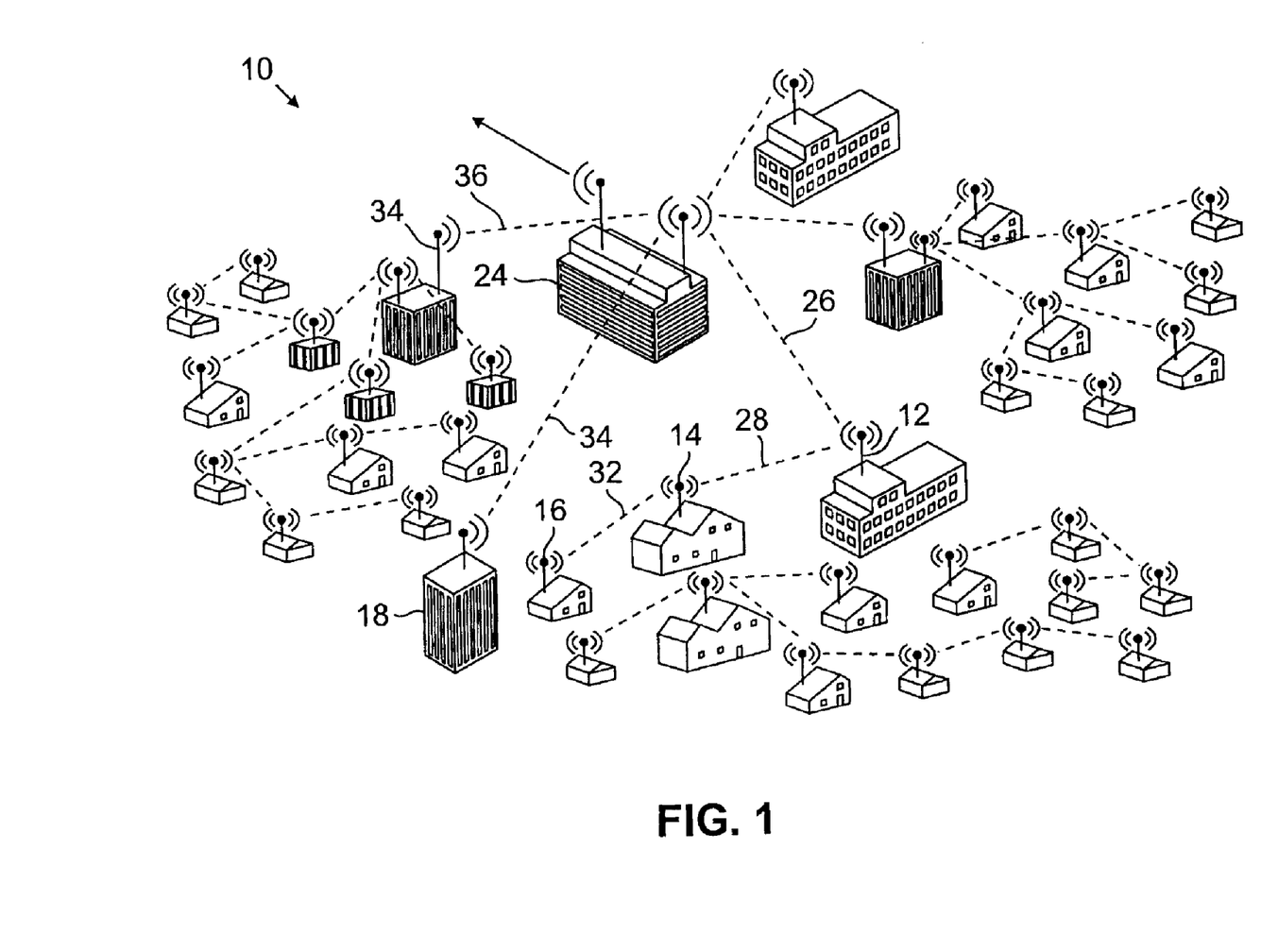
FIG. 1 illustrates a representation of an exemplary wireless mesh network in which an embodiment of the present invention is operable.

FIG. 1 illustrates a wireless mesh network, shown generally at 10, in which an embodiment of the present invention is operable. The wireless mesh network includes a plurality of nodes, of which the nodes referenced by 12, 14, 16, 18, and 22 are exemplary. Any of the nodes are able to communicat, either directly or by a hopping pattern, with a network management station 24 by way of one or more radio links.

The node 12 is coupled to the network management station 24 by way of the radio link 26, the node 14 is coupled to the station 24 by way of a radio links 26 and 28, the node 16 is coupled to the station 24 by way of a radio links 26, 28, and 32, the node 18 is coupled to the network management station 24 by way of a radio link 34, and the node 22 is coupled to the network management station by way of a radio link 36. Other radio links with other nodes and with the network can similarly be shown.

Between individual ones of the nodes 12–22, local communications are effectuable by way of local radio links. The conditions of the radio links must exhibit appropriate characteristics, such as low levels of interference, to ensure that communication quality levels of communications between nodes, and also with the network management station, are of acceptable levels.

In the exemplary implementation, the wireless mesh network is operable in an unlicensed frequency band, such as the 5 GHz band. Due to the unstructured nature of communications of communication systems installed in unlicensed bands, there is an increased possibility that interfering signals generated during operation of another communication system might disrupt, or otherwise interfere with, communications effectuated during operation of the wireless mesh network.

Operation of an embodiment of the present invention provides a manner by which to allocate frequencies upon which to define channels, both channels used throughout the entire wireless mesh network and also those used locally at individuals ones of the nodes of the wireless mesh network. The frequency level selections are dynamically made, and reselection of frequency levels upon which to define communication channels is made as changes in communication conditions warrant. That is to say, a dynamic frequency selection scheme is provided by which to select frequency levels upon which to define both global channels and upon which to define local channels.

The network management station 24 is functionally operable to select frequency levels upon which to define global channels to be used throughout the entire wireless mesh network. Measurement information related to measurements made at individual ones of the nodes of communication quality indicia at different frequency levels upon which global communication channels can be defined are provided to the network management station during operation of an embodiment of the present invention. Responsive to evaluation of the measured values of the communication quality indicia, the network management station selects frequency levels at which to define global communication channels, such as a global control channel. Through additional operation of an embodiment of the present invention, local selection of local frequency levels upon which to define local channels is also effectuated. The local selection of the frequency level, or levels, is also responsive to measured values of communication indicia.

Figure 2:
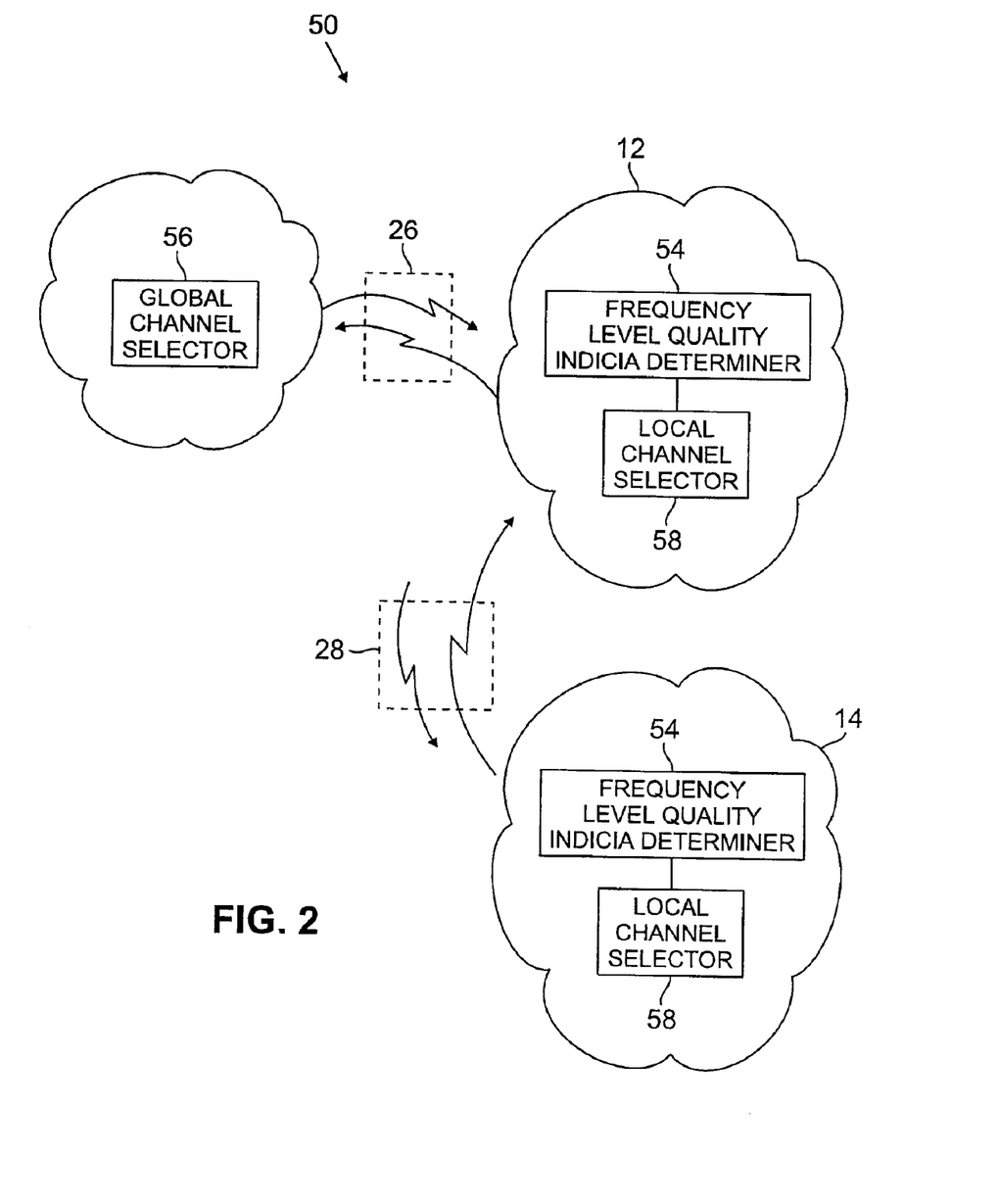
FIG. 2 illustrates a functional block diagram of an embodiment of the present invention by which dynamically to select frequency levels at which to define communication channels.

FIG. 2 illustrates the apparatus, shown generally at 50, of an embodiment of the present invention, here shown, for purposes of example, at the nodes 12 and 14, and at the network management station 24 of the communication system 10 (shown in FIG. 1). The elements of the apparatus are functionally represented and can be implemented in any of many desired manners, at appropriate structure at the respective portions of the wireless mesh network, or other radio communication system. The apparatus 50 is operable to select frequencies upon which to define communication channels to permit communications within additional nodes of the wireless mesh network as well as communications throughout the entire network. As communication conditions change, reselection of the frequency levels upon which to define communication charnels is made.

A frequency level quality measurer 54 is positioned at each node of the wireless mesh network. In the figure, for purposes of example, a first frequency level quality measurer is positioned at the node 12, and a second frequency level quality measurer 54 is positioned at the node 14. Each frequency level quality measurer is selectably operable to measure communication quality indicia, such as noise levels, at different frequency levels within the frequency band in which the network is operable. In one implementation, measurements are made automatically, at selected intervals. In another implementation, a request is made, such as a request generated at the network management station 24 to request the frequency level quality measurers to measure the communication quality indicia. When implemented in this manner, the requests for the measurements generated at the network management station are sent upon forward link portions of the radio links, here the radio links 26 and 28 formed between the network maintenance station and the nodes of the network. The measurements made by the frequency level quality measurers at the different frequency levels are recorded and communicated upon reverse link portions of the radio links back to the network management station.

The network management station is here shown to include a global channel selector 56. The selector 56 is coupled to receive indications of the records of the measurements made by the frequency level quality measurers at each of the different nodes. The selector is operable to evaluate the records of the measurements made at the different nodes. And, responsive to the evaluations, the global channel selectors selects one or more frequency levels to be used throughout the entire mesh network upon which to define global channels, such as control channels.

Local channel selectors 58 are also located at each of the nodes. The local channel selectors are coupled to the frequency level quality measurers 54. The local channel selectors are operable responsive to the measurements made locally to select one or more frequency levels upon which to define local channels or communications within the node at which the local channel selector is associated. Data channels upon which to communicate data between communication stations of the node are selected, for instance, by the local channel selector. As communication conditions change, reselection of the frequency levels upon which to define the communication channels are reselectable. Thereby, better assurances are provided that both local and global communications shall be less likely to be susceptible to communication quality degradation or interruption as a result of interference.

Figure 3:
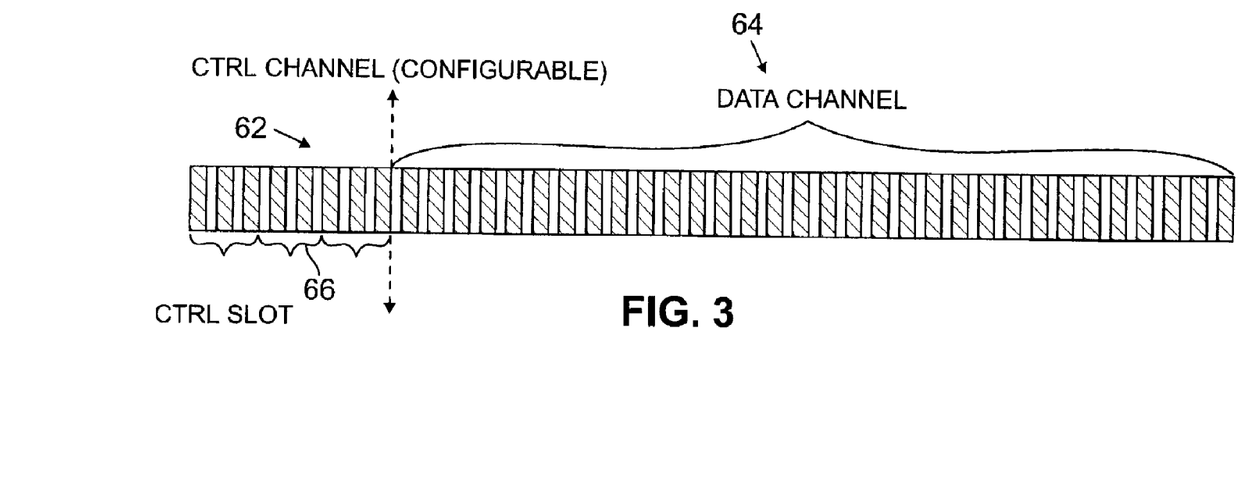
FIG. 3 illustrates a representation of a MAC frame structure pursuant to which communications effectuated by the wireless mesh network shown in FIGS. 1 and 2 are effectuated.

FIG. 3 illustrates time slots defined at a center frequency level pursuant to an implementation of the wireless mesh network shown in FIGS. 1 and 2. The time slots defined at the frequency level are divided into a control channel 62 portion and a data channel 64 portion. The control channel is configurable and includes, here, a plurality of control slots 66. In an exemplary implementation of an embodiment of the present invention, when measurements are made at the individual ones of the nodes of communication quality indicia to be reported back to the network management station, the measurements are performed during unused parts of the control slot 66. During unused parts of the control slot, communications are not being effectuated elsewhere in the wireless mesh network. When levels of noise, indicated by RSSI (received signal strength indication) values, form the communication quality indicia which is measured by the frequency level quality measurers, measurements of the noise levels during the unused parts of the control slot ensures that the measurements are of actual noise levels and not of communication signals generated during operation of the nodes of the wireless mesh network. Measurements are, if necessary, preprocessed at the individual ones of the nodes, and, thereafter, measurement reports are transmitted to the global channel selector located at the network maintenance station. The measurement report is represented, here, by DFS_measurement_report. When measurements are made automatically, the measurement reports are, correspondingly, transmitted to the network maintenance station automatically. If the measurements are made upon specific requests, here, a DFS_report_request, the request is manually initiated, such as by a network operator, or responsive to execution of a selection algorithm.

Figure 4:
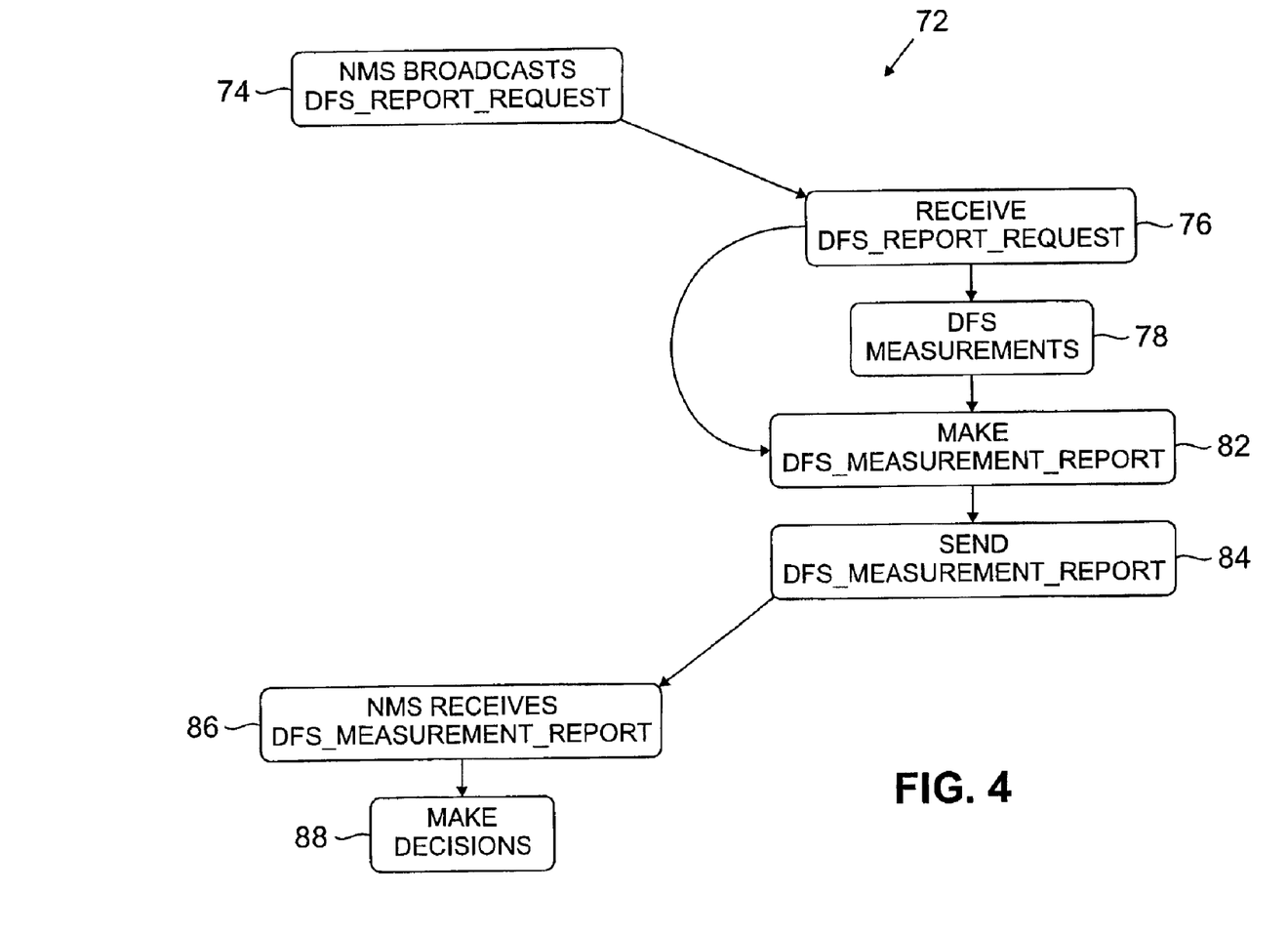
FIG. 4 illustrates a method flow diagram representative of the dynamic frequency selection measurement procedure of an embodiment of the present invention.

FIG. 4 illustrates a method flow diagram, shown generally at 72, of a dynamic frequency measurement procedure of an embodiment of the present invention. Here, global dynamic frequency selection of a frequency level upon which to define global channels is effectuated. As noted above, measurements are made at each of the nodes of the wireless mesh network growing unused parts of control slots, here to make RSSI measurements.

Here, initiation of the measurements, indicated by the block 74, are made by a DFS_report_request, generated by the network management station and broadcast upon radio links to the nodes of the network. The request is received, indicated by the block 76, at a node. Responsive thereto, DFS measurements are made, indicated by the block 78, at the node. Responsive to the measurements, a measurement report is generated, indicated by the block 82. Then, the measurement report is sent, indicated by the block 84, to the network maintenance station. The record of the measured values shall be described below with respect to FIGS. 6 and 7. The report is received at the network maintenance station, indicated by the block 86. Analysis of the reports received from each of the nodes of the network is made, and responsive thereto, frequency level decisions are made, indicated by the block 88.

Figure 5:
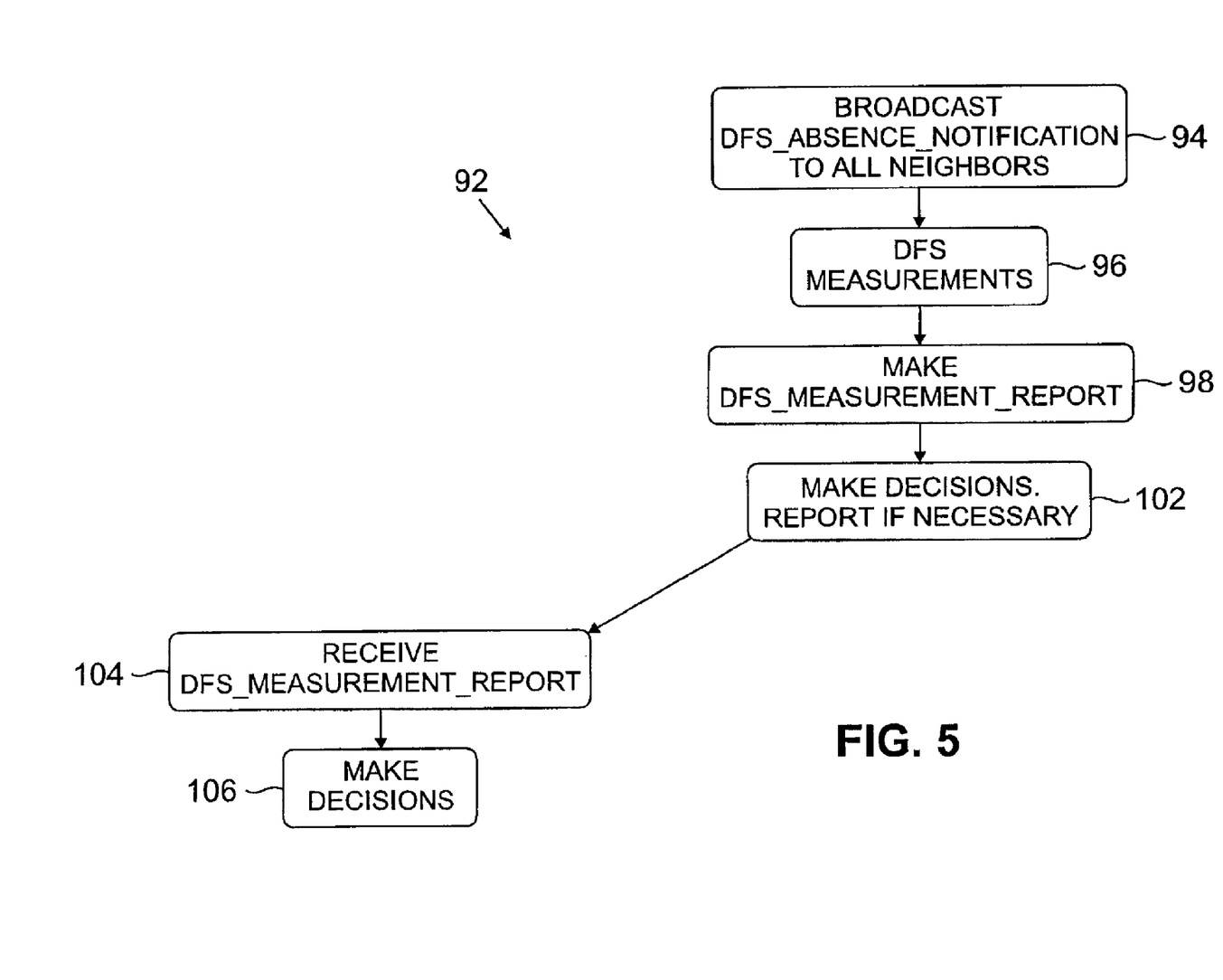
FIG. 5 illustrates another method flow diagram representative of a dynamic frequency selection measurement procedure of another embodiment of the present invention.

FIG. 5 illustrates a method, shown generally at 92, representative of operation of an embodiment of the present invention by which to select frequency levels to be used locally at a node of the network. Self-initiated RSSI measurements are made at the node, and results of the measurements are selectably made to neighboring nodes of the network. When a node is switched-on, and empty space is available at a data channel defined therein, self-initiated measurements are performed at the node at selected frequencies permitted for use at the node. The measurements of the noise levels at the permitted frequency levels are made within a selected time period.

In the exemplary implementation, neighboring nodes are notified of the measurements by way of a DFS_absence_notification message. The packet in which the message is contained is the same as the contents of a request element of a frame control packet, except that the measuring node is addressing the transmission to itself. The measurement period, DFS_measurement_period, and the frequency level are defined in the control packet. And, the specific request element ensures that, within a two-hop neighborhood, none of the nodes shall transmit signals during the measurement period at the corresponding frequency level. Thereby, an accurate measurement of noise levels is better assured. If a particular node requires that a measurement report be prepared by a neighboring node, the node, the "requesting" node, sends a report request, a DFS_report_request, to the neighboring node. The request to the neighboring node is to request measurements of data channels. Responsive thereto, a report, a DFS_measurement_report, is returned, containing either new measurements, or measurements made just prior to the request therefor.

First, and as indicated by the block 94, the DFS_absence_notification message is broadcast by a requesting node to neighboring nodes. Upon receipt of the message, and as indicated by the block 96, DFS measurements are performed. Measurements alternately are self-initiated during periods of low levels of data traffic. Measurements are performed by scheduling a frequency assessment period of a duration of less than n slots, the value of which is contained in a frame control packet communicated upon a control channel. The noise level at the different frequency levels, or other communication quality indicia at the different frequency levels, are made upon a selected set of frequency levels. Frequency versus measurement slots are, for instance, chosen randomly. A random frequency selection (RFS) calculation is, for instance:

$f_t = f_t - 1 + a$ random step. Alternately, the selection of the frequency versus measurement slots can be based upon transmission history.

Responsive to the measurements, a DFS_measurement_report is formed. Responsive to the measurements, and as indicated by the block 102, frequency level selections are made. If a report to another node is necessary, the report is transmitted thereto.

If a report is transmitted to another node, the report is received thereat, indicated by the block 104. Then, as indicated by the block 106, decisions are made at the requesting node. The node at which the measurements are made can also collect the measurements and send a report to the network maintenance station.

That is to say, in contrast to frequency selection for a global control channel, data channel frequency selection is a local process. All of the nodes continuously analyze the status of their respective radio links to their neighboring nodes. Frequency selections are made locally. Nodes assess the link quality in various manners. Generic link quality information, such as packet error ratios, determined for other purposes, is utilized in one implementation. In the aforementioned implementation, alternately, noise levels are measured. Responsive to the measurements, decisions on selection of data channel frequencies are made locally at the nodes. The nodes treat each link separately based upon frequency channel assessments.

Figure 6:
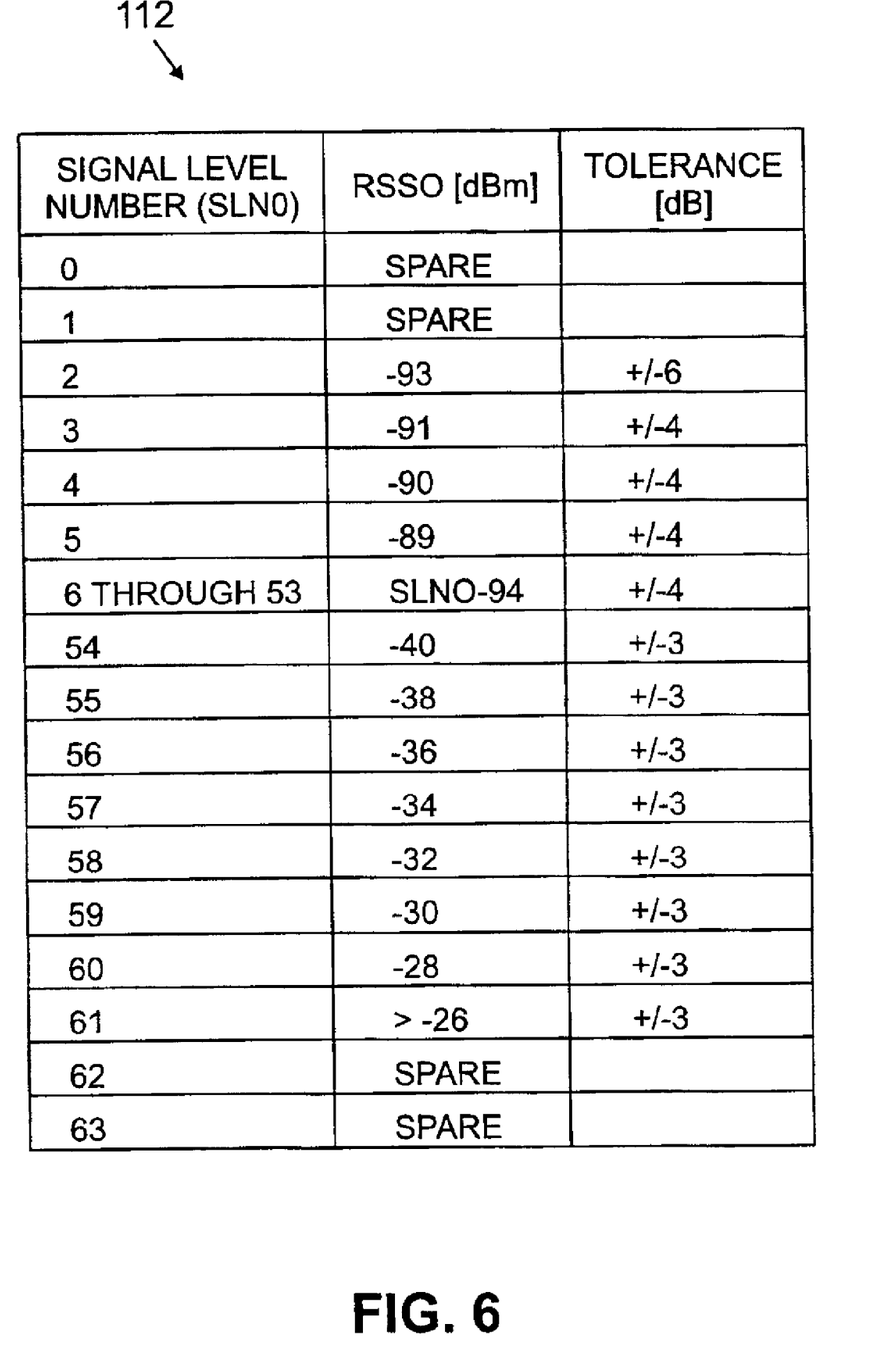
FIG. 6 illustrates an exemplary signal level table, exemplary of the accuracy required of measurements of noise level measurements made during operation of an embodiment of the present invention.

FIG. 6 illustrates a table, shown generally at 112, representative of signal level measurement requirements pursuant to operation of embodiments of the present invention shown in FIGS. and 5. Each node of the wireless mesh network is able to assess channel states. The exemplary assessment method is based upon RSSI measurements in which each of the nodes perform measurements of actual received, and sensed, signal strength levels. The measurements are performed during first preambles with accuracies represented in the table. SLNO steps are monotonic.

A node is able to search other nodes that are using different control channel frequencies only when the node is in a start up state or, alternately, when the node is in a sleep state. If nodes search other wireless mesh network devices in an attempt to synchronize thereto, the period lasts for two frames. The time offset, DFS_mesh_offset can be defined if other nodes are found. For instance, the value is set to 00 if there is no other mesh network, the value is set to 01 if there is the same operator's mesh network, and the value is set to 10 if there is an unknown mesh network.

Figure 7:
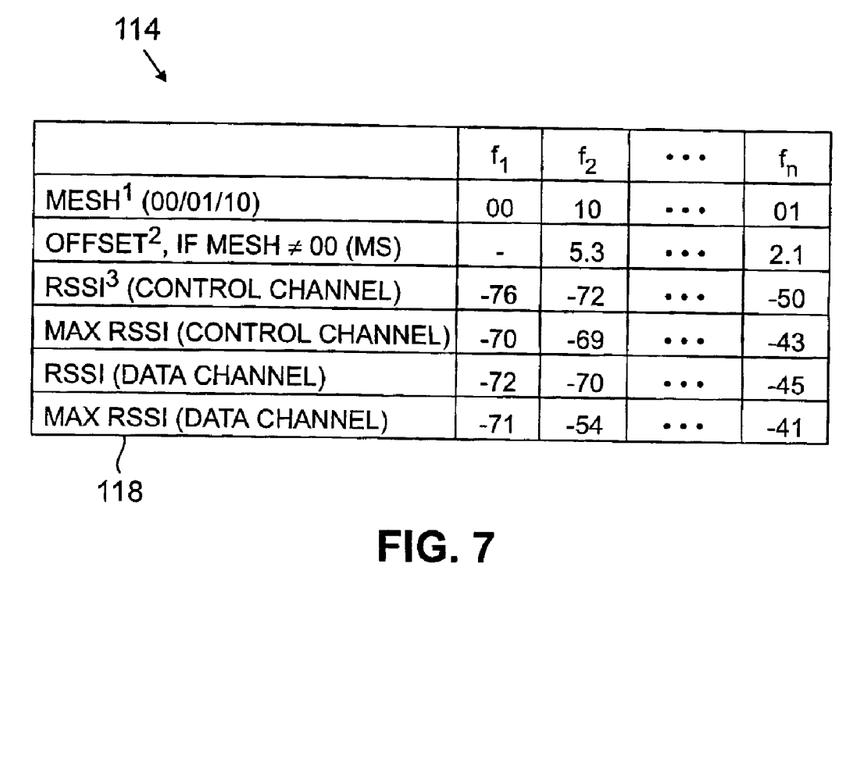
FIG. 7 illustrates a table representative of exemplary measurement results recorded during operation of an embodiment of the present invention.
Figure 8:
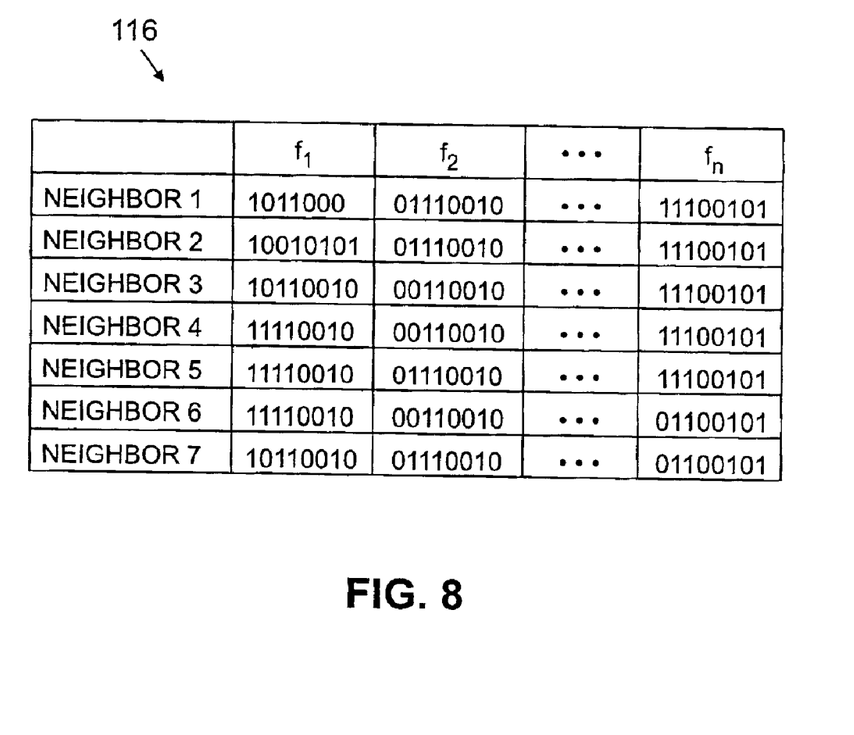
FIG. 8 illustrates another exemplary table representative of measurement results recorded during operation of an embodiment of the present invention.

FIGS. 7 and 8 illustrate tables 114 and 116, respectively. The tables are representative of recordation of measurement results. A left-most (as shown) column 118 of the table 114 lists various measurement indicia and additional columns of the table are representative of exemplary measured values at n frequency levels.

The dynamic frequency selection classifies frequencies for each neighboring node. For example, in the table 116 of FIG. 8, in the first neighbor at $f_1$, the value 10111000 is representative of a recommendation not to use the frequency $f_1$ in a second subframe when packets of data are to be sent to the neighboring one. And, one means that it is recommended to use the frequency in the subframe. Analysis of the information contained in the table 116 permits selection of a best broadcast channel in the appropriate neighborhood.

Figure 9:
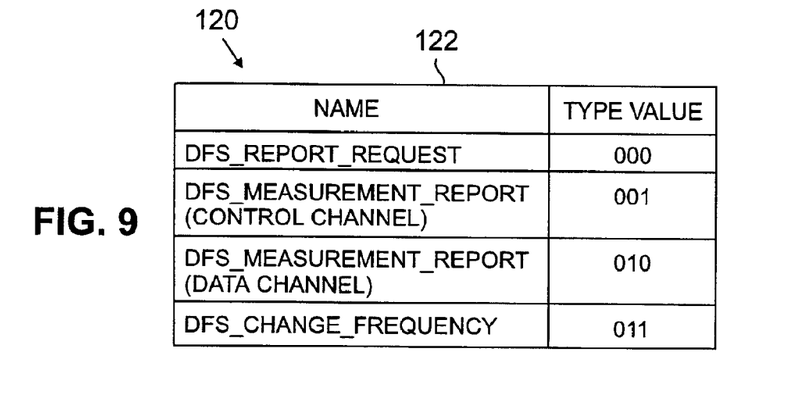
FIG. 9 illustrates a table representative of values associated with exemplary packet types generated during operation of an embodiment of the present invention.

FIG. 9 illustrates a table, shown generally at 118, in which exemplary type-values identifying the packet types listed in the left-most (as shown) column 122 of the table.

Figure 10:
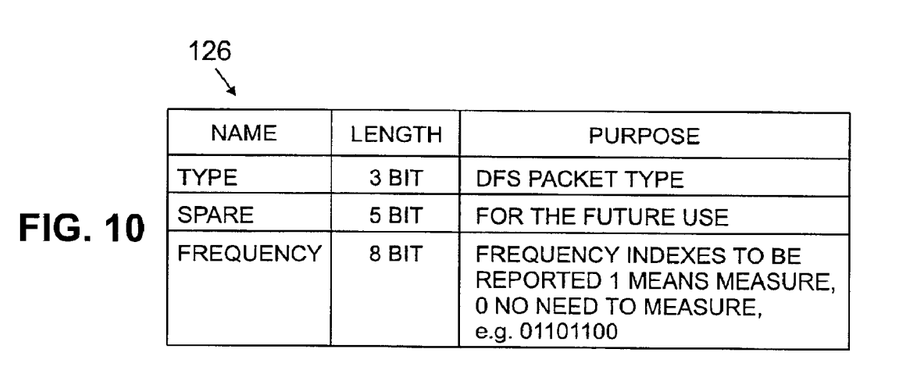
FIG. 10 illustrates another packet header information contained in a request packet generated during operation of an embodiment of the present invention.

FIG. 10 illustrates a table, showing generally at 126, listing packet header and information of a DFS_report_request message. Such a message is communicated by a requesting node to a neighboring node. All the data channel measurement requests are sent as unicast messages. Conversely, requests generated by the network management station are sent as broadcast messages.

Figure 11:
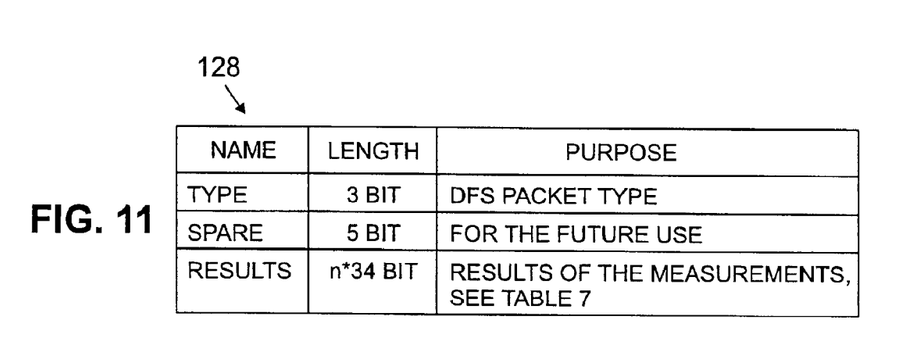
FIG. 11 illustrates packet header information values contained in a report packet generated during operation of an embodiment of the present invention.

FIG. 11 illustrates a table 128 which lists packet header and information of a report packet generated to report the RSSI measurements by individual ones of the nodes of the network to the network management station. The reports are sent by way of an airhead.

Figure 12:
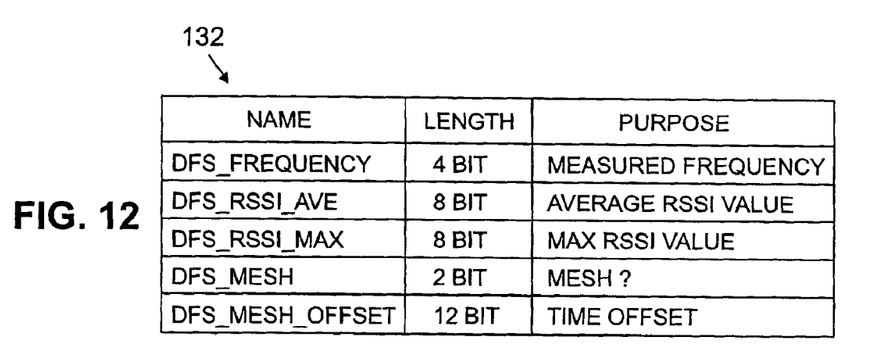
FIG. 12 illustrates a table representative of measurement messages generated during operation of an embodiment of the present invention.

FIG. 12 illustrates a table 132 which lists characteristics of various measurement results which form portions of a report packet, the packet header and information of which is listed in the table 128 of FIG. 11.

Figure 13:
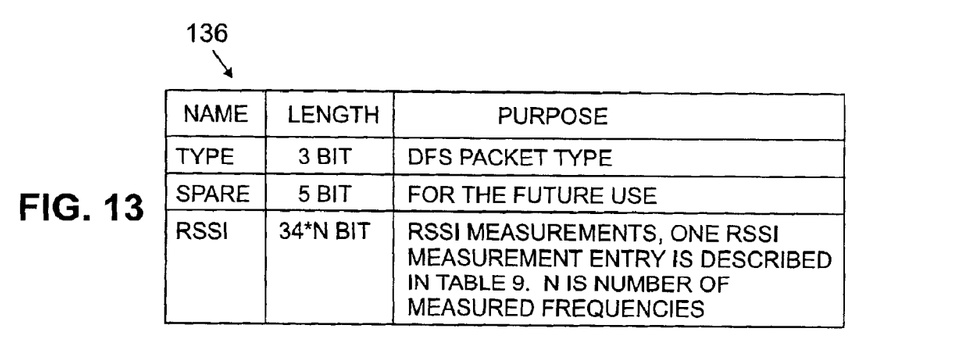
FIG. 13 illustrates a table representative of the contents of a report element generated during operation of an embodiment of the present invention.
Figure 14:
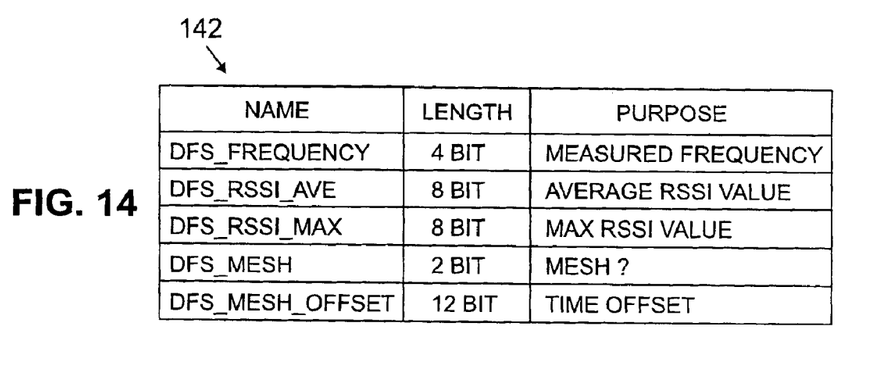
FIG. 14 illustrates a table representative of contents of signals generated during operation of an embodiment of the present invention.

FIG. 13 illustrates a table 136 which lists a packet header and information of a report packet, the packet header and information of which is listed in the table 128 of FIG. 11. And, FIG. 14 illustrates a table 142, similar to the table 132 shown in FIG. 12, but here representative of measurement results for data channel selection.

Selection of the frequency level to be used to form a global channel is made, as noted above, at the network management station. The selection is a rules-based selection based upon the measurement results listed in the table 132 of FIG. 12. Selection is made in an effort to minimize the overall RSSI levels in the network so that the lowest-possible RSSI levels are S exhibited at all of the nodes. An average of the summation of all of the measured RSSI values, in one implementation is utilized to select the frequency level. Other minimization definitions can instead be utilized. During remeasurement operations, selection is also made at the network maintenance station as to whether a change in the control channel frequency is necessary.

Figure 15:
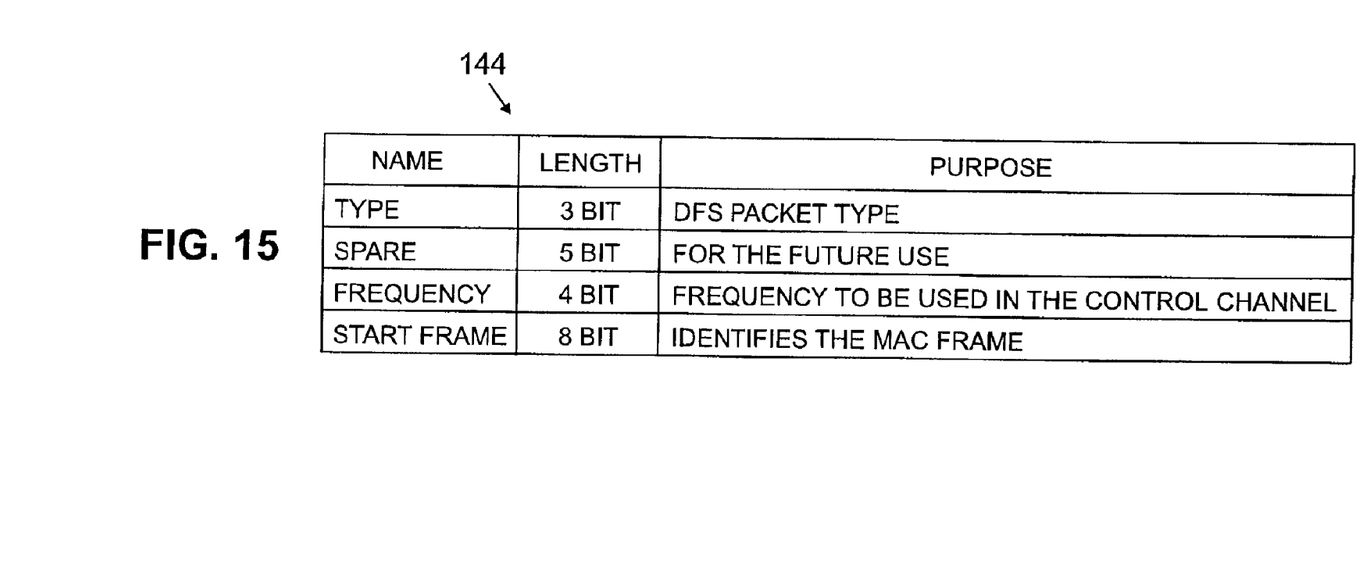
FIG. 15 illustrates a table representative of contents of a change frequency element generated during operation of en embodiment of the present invention.

FIG. 15 illustrates a table 144 which lists packet header and information of a change frequency packet forming a DFS_change_frequency message generated at a network maintenance station. The message is generated either automatically, responsive to calculations performed at the network maintenance station, or through operator initiation of the channel frequency change.

Thereby, manner is provided by which to dynamically select frequencies upon which to define channels in a wireless mesh network, or other radio communication system. Frequency levels upon which to define communication channels are selected, and reselected, as appropriate, to facilitate quality of communications in the mesh network, or other communication system.

The preferred descriptions are of preferred examples for implementing the invention, and the scope of the invention should not necessarily be limited by this description. The scope of the present invention is defined by the following claims.

What is claimed is:

1. In a wireless mesh network having a first node, at least a second node and a network management station, the first and at least second nodes and the network management station intercoupled theretogether to permit communications therebetween, an improvement of apparatus for dynamically selecting frequency levels at which to define communication channels upon which to effectuate communications during operation of the wireless mesh network, said apparatus comprising:

a frequency level quality indicia measurer positioned at each of the first and at least second nodes, said frequency level quality-indicia measurer for measuring communication quality indicia at a selected plurality of different global frequency levels at the node at which each of said frequency level quality-indicia measurers is positioned and for generating a report representative of values of the communication quality indicia measured thereat;

a global channel selection positioned at the network management station and coupled to receive reports generated by each of said frequency level quality-indicia measurers, said global channel selector for selecting a first global frequency level at which to define a first global communication channel upon which to communicate first global communication signals with, and between, all of the first and at least second nodes.

2. The apparatus of claim 1 wherein the communication quality indicia measurer measures noise levels at each of the selected plurality of different global frequency levels and wherein the reports generated thereat contain listings of values of the noise levels measured at the different global frequency levels.

3. The apparatus of claim 2 wherein selection by said channel selector of the first frequency level at which to define the first communication channel is made responsive to the listings of the values of the noise levels measured at the different global frequency levels at the first and at least second nodes.

4. The apparatus of claim 3 wherein the frequency level selected by said global channel selector from amongst the plurality of different global frequency levels to form the first frequency level comprises the frequency level which exhibits minimal noise levels according to a selected criteria.

5. The apparatus of claim 4 wherein the selected criteria according to which said global channel selector determines the first frequency level to exhibit the minimal noise levels comprises lowest average noise levels.

6. The apparatus of claim 4 wherein the selected criteria according to which said global channel selector determines the first frequency level to exhibit the minimal noise levels comprises the maximum noise levels measured at the different global frequency levels.

7. The apparatus of claim 1 wherein the first communication channel defined at the first frequency level selected by said channel selector comprises, a control channel upon which to communicate control signals with the first and at least second nodes.

8. The apparatus of claim 1 wherein data communications are selectably effectuable by the first and at least second nodes, and wherein measurements made by said frequency level quality indicia measurers are made during time periods absent of data communication by the first and at least second nodes.

9. The apparatus of claim 8 wherein the wireless mesh network is operable pursuant to a protocol scheme which defines control slots forming time slots during which only control signals are generated, and wherein the measurements made by said frequency level quality indicia measurer at each of the first and at least second nodes are made during the control slots.

10. The apparatus of claim 1 wherein said frequency level quality indicia measurer further remeasures the communication quality indicia at selected intervals.

11. The apparatus of claim 10 wherein said global channel selector further selects the first frequency level at which to define the first communication channel responsive to remeasurements made by said frequency level quality indicia measurer.

12. The apparatus of claim 1 wherein measurements made by said frequency level quality indicia measurer are made automatically at selected intervals.

13. The apparatus of claim 1 wherein measurements made by said frequency level quality indicia measurer are made responsive to requests therefor.

14. The apparatus of claim 13 wherein the requests for measurements, responsive to which said frequency level quality indicia measurer makes measurements, are generated at the network management station.

15. The apparatus of claim 1 wherein said frequency level quality indicia measurer positioned at each of the first and at least second nodes farther selectably measure communication quality indicia at a selected plurality of different local frequency levels.

16. The apparatus of claim 15 further comprising a first local channel selector positioned at the first node and coupled to receive indications of measurements made by said frequency level quality indicia measurer positioned at the first node of the communication quality indicia at the selected plurality of different local frequency levels, said first local channel selector for selecting at least a first local frequency level at which to define at learnt a first local communication channel upon which to communicate first local communication signals within the first node.

17. The apparatus of claim 16 wherein said frequency level quality indicia measurer further generates a report representative of values of communication quality indicia of the selected plurality of different local frequency levels and wherein selection made by said first local channel selector is made responsive to values of the report representative of the values of the communication quality indicia of the selected plurality of different local frequency levels.

18. The apparatus of claim 15 further comprising a second local channel selector positioned at the second node and coupled to receive indications of measurements made by said frequency level quality indicia measurer positioned at the first node of the communication quality indicia at the selected plurality of different local frequency levels, said second local channel selector for selecting at least a second local frequency level at which to define at least a second local communication channel upon which to communicate second local communication signals within the second node.

19. The apparatus of claim 15 wherein at least portions of frequency ranges within which the different global frequency levels are located and of frequency ranges within which the different local frequency levels are located overlap.

20. In a method for communicating in a wireless mesh network having a first node, at least a second node, and a network management station, the first and at least the second nodes and the network management station intercoupled theretogether to permit communications therebetween, an improvement of a method for dynamically selecting frequency levels at which to define communication channels upon which to effectuate communication during operation of the wireless mesh network, said method comprising:

measuring communication quality indicia at a selected plurality of different global frequency levels at each of the first and at least second nodes;

generating reports representative of values of the communication quality indicia measured during said operation of measuring; and selecting a global frequency level at which to define a first global communication channel upon which to communicate first global communication signals with, and between, all of the first and at least second nodes.

21. The method of claim 20 further comprising the operation of measuring at the first node communication quality indicia at a selected plurality of different local frequency levels.

22. The method of claim 21 further comprising the operation of selecting at least a first local frequency level at which to define at least a first local communication channel upon which to communicate first local communication signals within the first node.

* * * * *